United States Patent
Wier

[11] Patent Number: 6,079,745
[45] Date of Patent: Jun. 27, 2000

[54] PYROTECHNICAL LINEAR ACTUATING MEANS FOR A BELT TENSIONER

[75] Inventor: Franz Wier, Göggingen, Germany

[73] Assignee: TRW Occupant Restraint Systems GmbH, Alfdorf, Germany

[21] Appl. No.: 08/892,117

[22] Filed: Jul. 14, 1997

[30] Foreign Application Priority Data

Jul. 23, 1996 [DE] Germany .................. 296 12 781 U

[51] Int. Cl.[7] .............................. B60R 22/36; F42B 3/12
[52] U.S. Cl. ........................ 280/806; 102/202.14
[58] Field of Search ................... 280/806, 741, 280/736; 297/480; 102/202.14

[56] References Cited

U.S. PATENT DOCUMENTS

| | | | |
|---|---|---|---|
| 5,145,209 | 9/1992 | Lenzen | 280/806 |
| 5,350,194 | 9/1994 | Fohl | 280/806 |
| 5,403,037 | 4/1995 | Fohl | 280/806 |
| 5,411,291 | 5/1995 | Fohl | 280/806 |
| 5,450,723 | 9/1995 | Fohl | 280/806 |
| 5,468,019 | 11/1995 | Blase | 280/806 |
| 5,519,997 | 5/1996 | Specht | 280/806 |
| 5,564,743 | 10/1996 | Marchant | 280/741 |
| 5,568,940 | 10/1996 | Lane, Jr. | 280/806 |
| 5,622,380 | 4/1997 | Khanhadia et al. | 280/741 |
| 5,704,638 | 1/1998 | Lane, Jr. | 280/806 |
| 5,799,977 | 9/1998 | Miyazaki et al. | 280/806 |
| 5,863,009 | 1/1999 | Bauer et al. . | |
| 5,936,186 | 8/1999 | Wier | 280/806 |

OTHER PUBLICATIONS

U.S. Bauer et al. Patent Application Serial No. 08/998,240, filed Dec. 24, 1997 for Apparatus for Pretensioning Seat Belt Webbing.

*Primary Examiner*—Lanna Mai
*Assistant Examiner*—Jeff Restifo
*Attorney, Agent, or Firm*—Tarolli, Sundheim, Covell, Tummino & Szabo LLP

[57] ABSTRACT

A pyrotechnical linear actuating means for a belt tensioner, comprises a piston/cylinder unit having a piston and a cylinder, a multi-stage gas generator having several propellants separated from each other for actuating the piston, and an ignition unit for activating the propellants of the gas generator. Each of the propellants being activatable separately individually or at the same time.

18 Claims, 4 Drawing Sheets

PYROTECHNICAL LINEAR ACTUATING MEANS FOR A BELT TENSIONER

TECHNICAL FIELD

The invention relates to a pyrotechnical linear actuating means for a belt tensioner.

BACKGROUND OF THE INVENTION

In conventional pyrotechnical linear actuating means the pyrotechnical propellant is dimensioned for vehicle occupants of average body weight, this being the reason why the belt is tautened with the same force for small, tall, lightweight or heavy occupants. The intention in optimizing belt tensioning is to involve the vehicle occupant as early as possible in the deceleration of the vehicle in a crash situation. However, in the case of smaller persons of low weight this object may already be achieved by a tensioning force which is smaller than that of persons of average or higher body weight.

BRIEF DESCRIPTION OF THE INVENTION

The invention provides a pyrotechnical linear actuating means for a belt tensioner, the actuating energy of which is made available in several stages to ensure belt tensioning optimally adapted to such parameters as stature, weight of the occupant, seating position or intensity of collision. The pyrotechnical linear actuating means according to the present invention comprises a piston/cylinder unit having a piston and a cylinder, a multi-stage gas generator having several propellants separated from each other for actuating the piston, and an ignition unit for activating the propellants of the gas generator. Each of the propellants being activatable separately individually or at the same time. The gas generator constitutes a unit of its own in which the propellants are arranged separate from each other. Accordingly, there is no need to incorporate several gas generators, each having its own propellant in the linear actuating means, thus simplifying assembly.

Preferably two propellants having differing actuating capacities are contained in the gas generator so that three different actuating capacities are achievable, namely that of each individual propellant and, on simultaneous activation of both propellants the sum of the individual actuating capacities, the ratio of the actuating capacities being preferably in the ratio of roughly 1 to 2.

The linear actuating means according to the invention is assigned at least one sensor for sensing the vehicle occupant, vehicle or vehicular environment parameters and an activator connected thereto which controls activation of one or more propellants as a function of the sensed parameters. The parameters which can be sensed thereby are e.g. seat occupancy, body weight, stature or seating position of vehicle occupants as well as collision intensity, vehicular indoor or outdoor temperature. Including the last two parameters in sensing the actuating capacity to be generated is based on the following reasoning: at low outdoor temperatures and low temperatures in the vehicle interior, e.g. in winter, it is to be assumed that a vehicle occupant wears heavier clothing so that a seat belt is not in close contact with the body of the vehicle occupant and that the vehicle occupant needs to be moved far in case of a collision due to the thick layers of pliant clothing until he is restrained by the seat belt. In such a case a belt tensioner needs to have a higher actuating capacity so as to quickly bring the seat belt to bear on the body of the occupant.

In one preferred embodiment the gas generator, is a circular ring-shaped body adjoining the cylinder wall in the interior of the cylinder, a parting wall being provided between the propellants in the interior of the gas generator, the parting wall being all-in-all oriented axially. Each propellant is separated by a face end cover from the working space and protected from being activated on igniting of the other propellant.

DETAILED DESCRIPTION OF PREFERRED EMBODIMENTS

Figure 1:
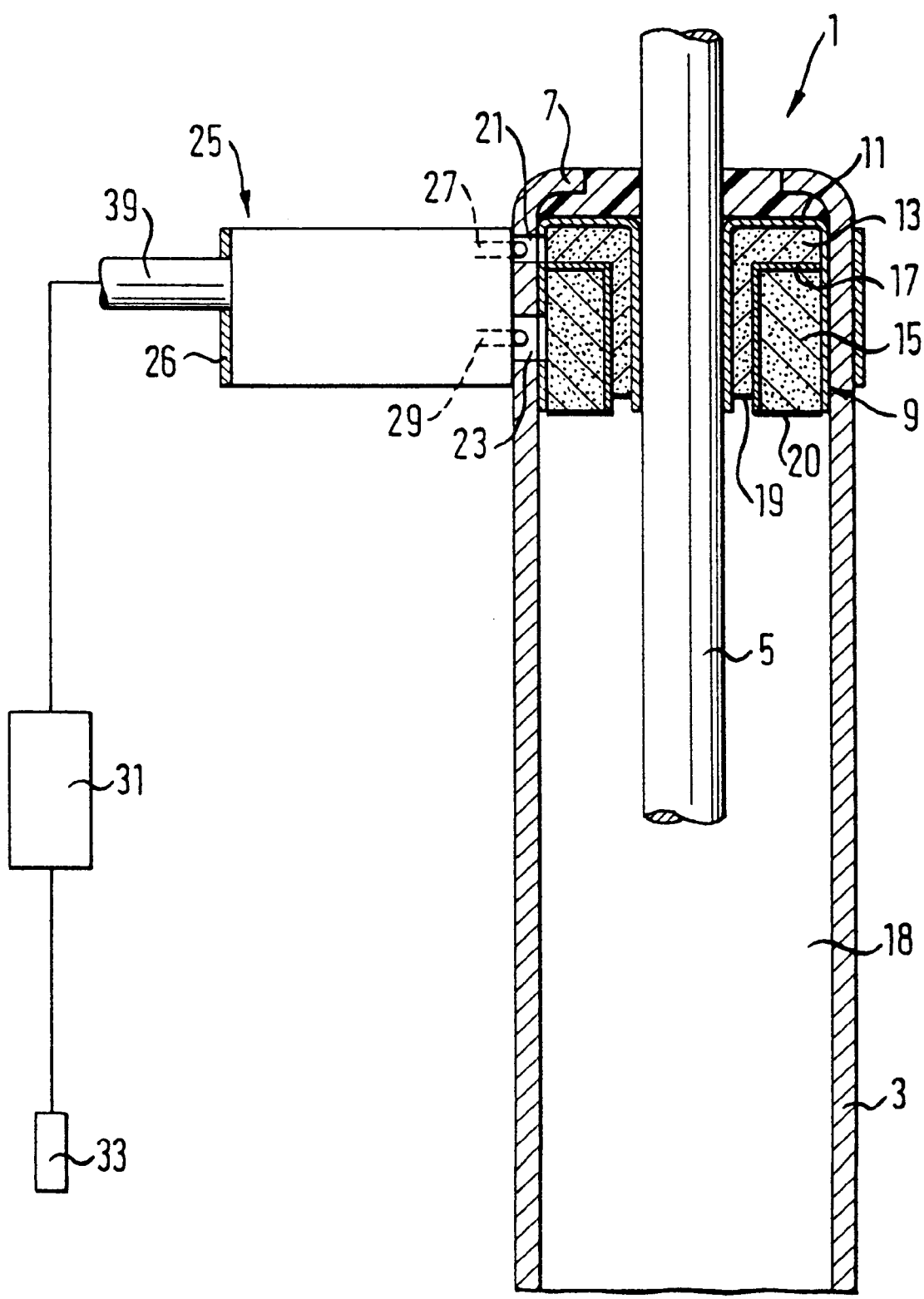
FIG. 1 is a longitudinal section view through a first embodiment of the linear actuating means in accordance with the invention having a gas generator arranged in the interior of the cylinder with two propellants which are activatable via a common ignition unit.

Shown in FIG. 1 is a pyrotechnical linear actuating means 1 for a belt tensioner featuring a unit comprising an actuatable piston (not shown) and a cylinder 3. A piston rod 5 extends outwardly from the piston through an opening at the face end 7 of the cylinder 3 where it is connected to a means for sensing the seat belt. In the interior of the cylinder 3, adjoining the face end 7, a circular ring-shaped gas generator 9 surrounding the piston rod 5 is provided, the gas generator including a thin circular ring-shaped housing i1. In the interior of the gas generator 9 two propellants located spatially separate from each other, namely a first propellant 13 and a second propellant 15 are provided. The ratio of the actuating capacities of the two propellants 13, 15 is roughly 1 to 2. The two propellants 13, 15 are separated from each other by a rotationally symmetrical wall 17 having an L-shaped cross-section. The parting wall 17 is arranged so that both propellants 13, 15 are in connection with a working space 18 in the interior of the cylinder 3. Each propellant 13, 15 is separated, however, by a face end cover 19, 20 from the working space 18.in the non-actuated condition of the linear actuating means 1.

Each of the two through-openings 21, 23 at the generated surface of the cylinder 3 is in connection with a propellant 13 and 15, respectively, the housing 11 of the gas generator 9 being recessed in the region of the through-openings 21, 23. A common ignition unit 25 is secured by a clamping ring 26 to the generated surface of the cylinder 3 and primers 27 and 29 extending from the ignition unit 25 protrude partly into the through-openings 21 and 23, respectively.

The ignition unit 25 is connected via a cable 39 to an electronic activator 31 to which in turn several sensors are connected, of which only one sensor 33 is illustrated. The sensors provided being a crash sensor, a sensor for sensing collision intensity, a sensor for sensing seat occupancy, a sensor for sensing the body weight of a vehicle occupant and a sensor for sensing the outdoor temperature.

Figure 2:
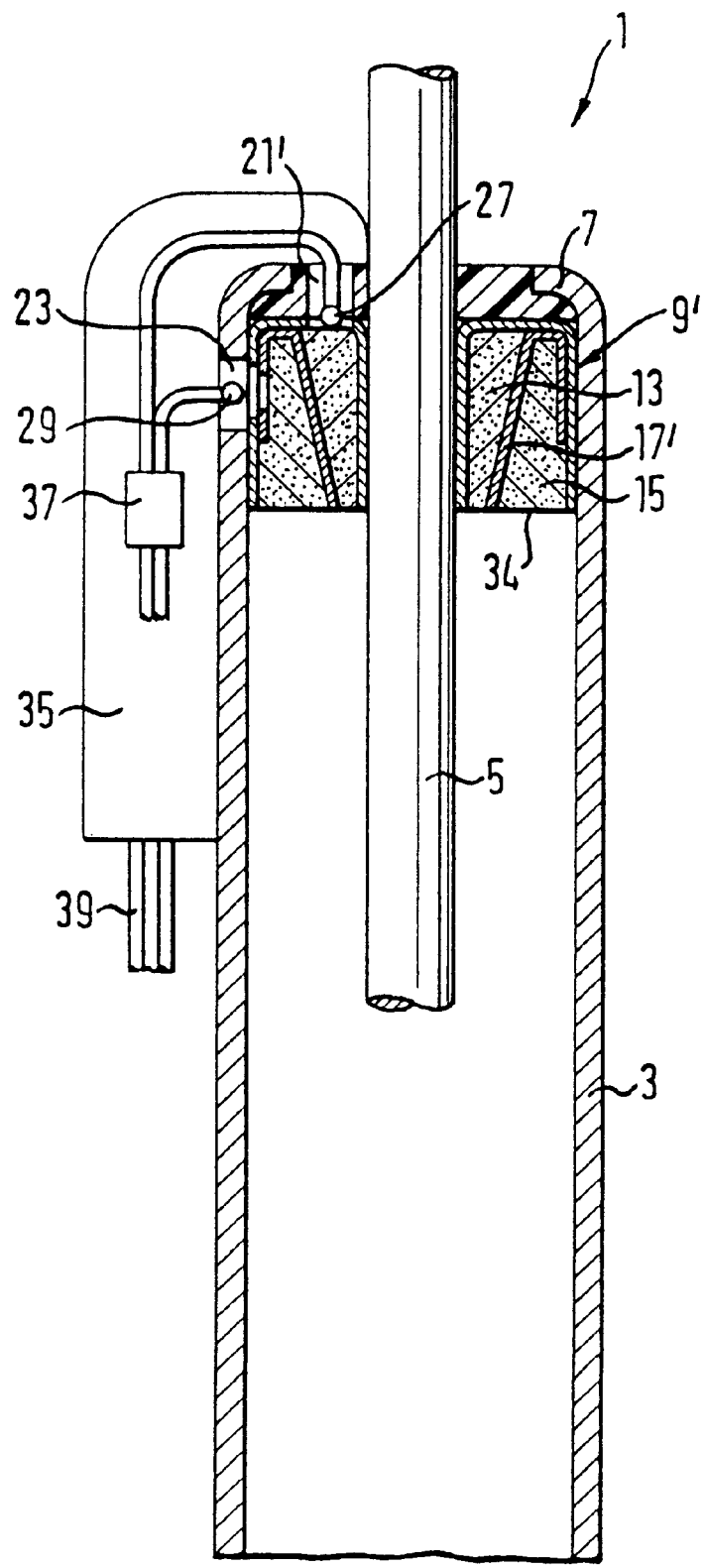
FIG. 2 is a corresponding view of a second embodiment of the linear actuating means in accordance with the invention in which, however, the spaces filled by two propellants in the interior of the gas generator exhibit a different geometry to that of the embodiment shown in FIG. 1.
Figure 3:
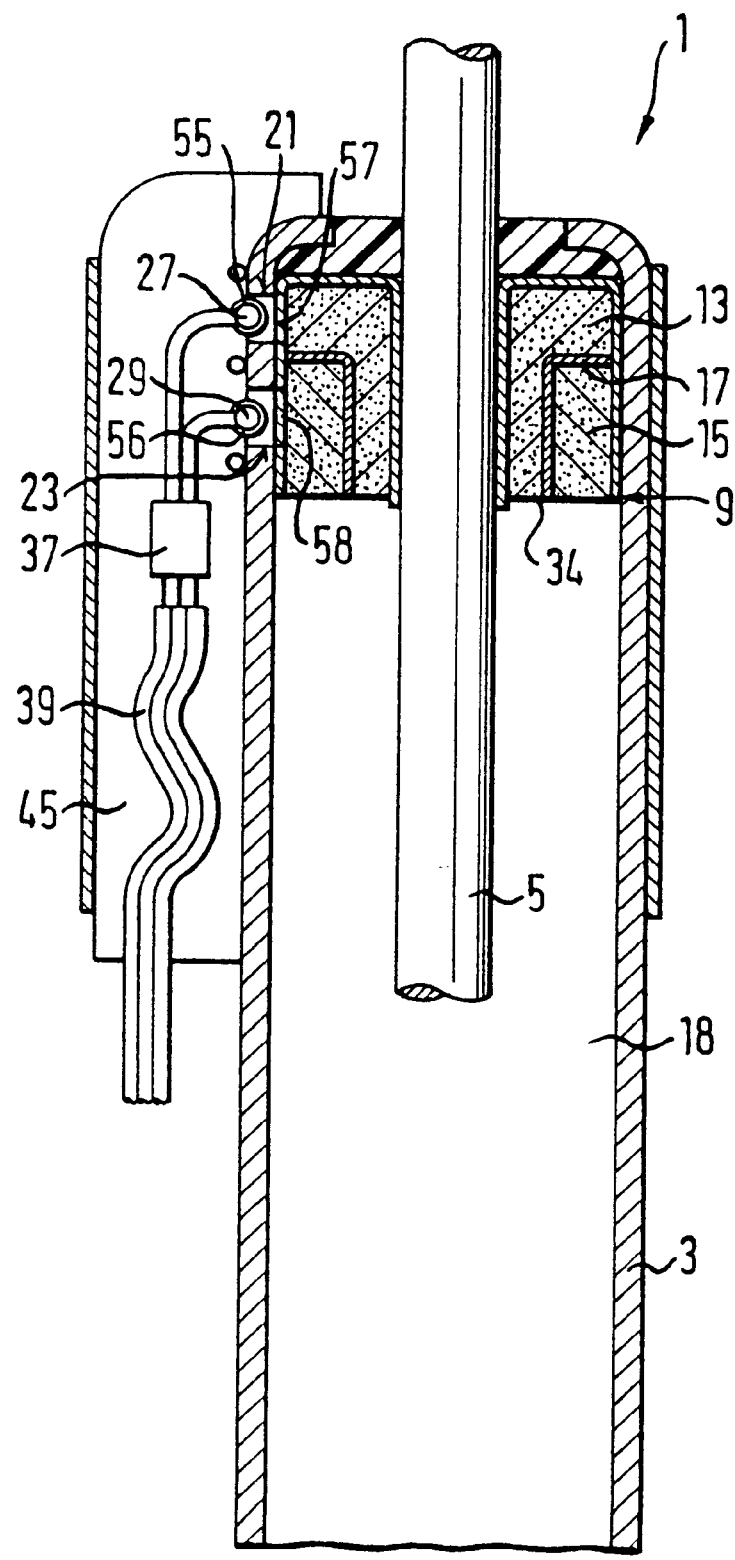
FIG. 3 is a corresponding view of a third embodiment of the linear actuating means in accordance with the invention featuring an ignition unit modified with respect to that shown in FIG. 1.
Figure 4:
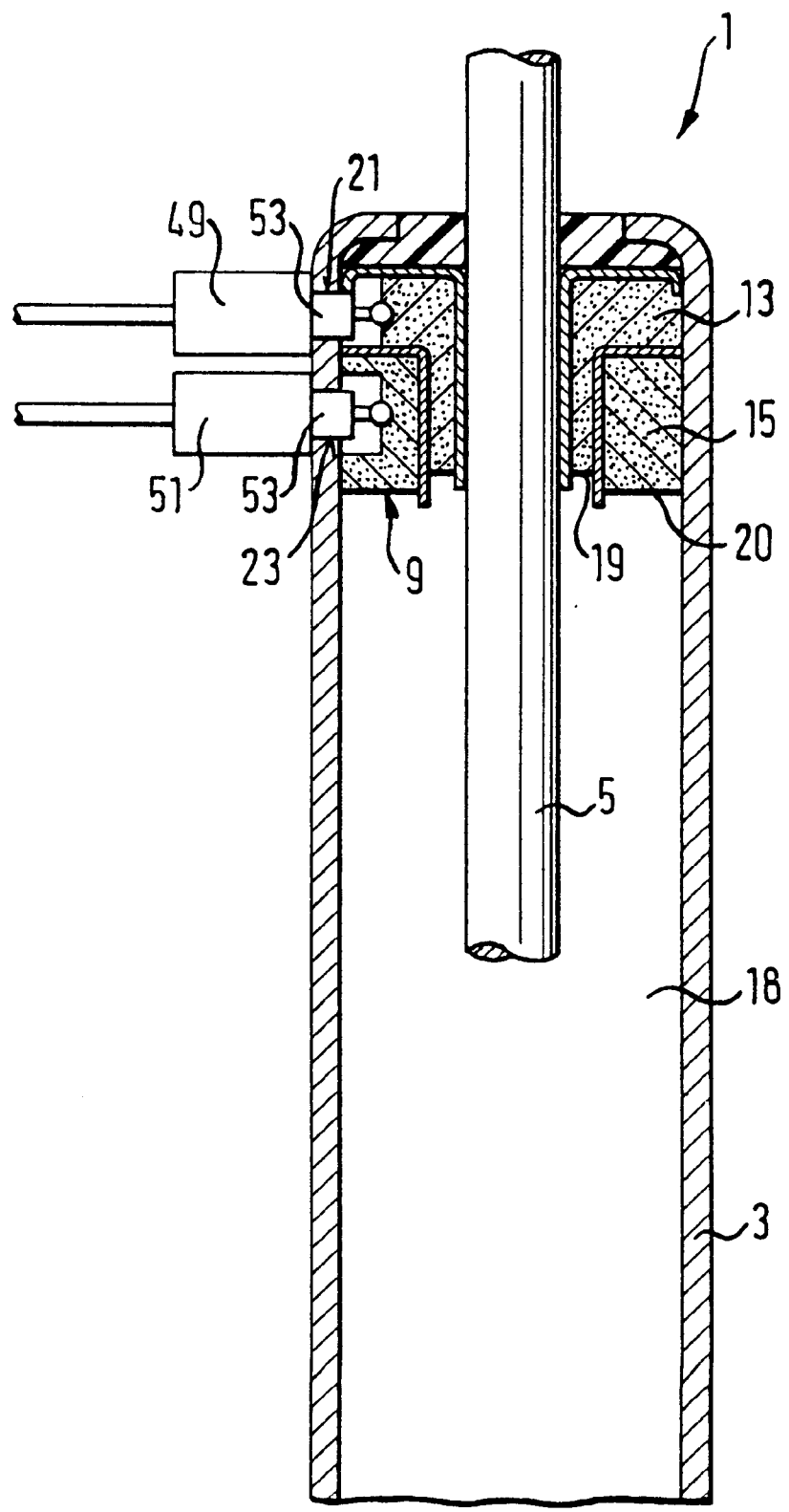
FIG. 4 shows a fourth embodiment of the linear actuating means in accordance with the invention having two separate ignition units for the propellants.

The activators 31 and sensors 33 provided in the case of the embodiment as shown in FIGS. 2 through 4 are not illustrated.

In the case of the embodiment shown in FIG. 2 the gas generator 9' is slightly modified with respect to the gas generator 9 shown in FIG. 1, by the parting wall 17' being conically tapered within the gas generator 9' towards the piston. The two covers 19, 20 shown in FIG. 1 are combined to a common cover 34. Furthermore, the through-opening 21' is provided at the face end 7 and the through-opening 23 again in the generated surface of the cylinder 3, this being the reason why the common ignition unit 35 extends up to the face end 7. The multi-core cable 39 connected to the activator 31 extends into the interior of the ignition unit 35 and is connected to a high-frequency choke 37, following which the cable 39 is branched off by individual cores leading to the primers 27, 29. The common high-frequency choke 37 is arranged in the common ground lead of the primers 27, 29.

The embodiment shown in FIG. 3 differs from that shown in FIG. 1 by the ignition unit 45, which is similar to ignition unit 35 shown in FIG. 2, being configured as an elongated body adjoining the generated surface of the cylinder 3 and not standing off therefrom as is evident from FIG. 1. Both through-openings 21, 23 are, however, the same as in the embodiment shown in FIG. 1 provided in the generated surface of the cylinder 3. The housing 11 is closed in the regions 57, 58 of the through-openings 21, 23 but e.g. weakened by an annular groove or by a perforation to facilitate breaking through the housing 11 on igniting. Furthermore, each primer 27, 29 is surrounded by a shell 55, 56 of a pyrotechnical material for boosting ignition which in the embodiment shown in FIG. 3 protrudes into the corresponding through-opening 21, 23.

In the case of the embodiment of the linear actuating means 1 shown in FIG. 4, to each propellant 13, 15 is assigned its own ignition unit 49 and 51, respectively, each of the ignition units 49, 51 being configured as a plug connection. The plug connection has a projection 53 of small cross-section which is inserted into through-openings 21, 23 of correspondingly larger cross-section in the generated surface of the cylinder 3 by a press-fit.

The functioning of the linear actuating means 1 will now be explained with respect to FIG. 1. When the vehicle is involved in a collision, a corresponding signal is applied by a crash sensor to the activator 31. The latter initiates, depending on whether a seat is occupied or not, depending on the body weight of the vehicle occupant, stature and seat position, activation of one or both propellants 13, 15 via the ignition unit 25. If the sensors sense that the linear actuating means 1 needs to be activated for a small, lightweight vehicle occupant, only the first propellant 13 is activated by the primer 27, and gas flows into the working space 18, the cover 19 thereby being penetrated. The cover 20 at the face end not destroyed by the gas pressure prevents activation of the propellant 15 which is not required to be ignited by the ignited propellant 13. In the case of only one propellant being ignited only the region of the cover 34 assigned to the activated propellant is destroyed in the embodiments shown in FIGS. 2 and 3.

In the case of a vehicle occupant of average constitution only the second propellant 15 is ignited. In the case of heavy, tall vehicle occupants, especially when the outdoor temperature is very low, a high actuating capacity of the linear actuating means 1 is required so that, in a crash situation both, propellants 13, 15 are activated independently of each other, but at the same time.

I claim:

1. A pyrotechnic linear actuator for a belt tensioner comprising:

a cylinder having a cylinder wall defining an interior;

a piston disposed in said interior of said cylinder;

a multi-stage gas generator disposed in said interior of said cylinder and being located coaxial with said piston, said gas generator having several actuatable propellants for generating gas to move said piston in said cylinder, said gas generator having a ring-shaped body adjoining said cylinder wall defining said interior of said cylinder, said gas generator including a parting wall separating said propellants from each other; and an ignition unit for actuating said propellants in said gas generator;

each of said propellants in said gas generator being actuatable separately, individually, or at the same time.

2. The linear actuator as set forth in claim 1 wherein said gas generator has first and second propellants, said second propellant encircling at least a portion of said first propellant.

3. The linear actuator as set forth in claim 2 wherein said parting wall includes an axially extending portion and a radially extending portion.

4. The linear actuator as set forth in claim 2 wherein said parting wall has a conical configuration.

5. The linear actuator as set forth in claim 1 further comprising at least one sensor for sensing at least one of a vehicle occupant parameter, a vehicle parameter, and a vehicular environment parameter, and an activator connected to said at least one sensor which controls activation of one or more of said propellants as a function of the sensed parameters.

6. The linear actuator as set forth in claim 5 wherein said at least one sensor senses at least one of seat occupancy, body weight of a vehicle occupant, stature of a vehicle occupant, seating position of a vehicle occupant collision intensity, vehicular indoor temperature, and outdoor temperature.

7. The linear actuator as set forth in claim 1 wherein said propellants have differing actuating capacities.

8. The linear actuator as set forth in claim 1 wherein said ignition unit is operatively connected to each of said propellants and has a corresponding primer assigned to each of said propellants.

9. The linear actuator as set forth in claim 8 wherein each primer is surrounded by a shell of pyrotechnic material for boosting ignition.

10. The linear actuator as set forth in claim 8 further comprising a common cable extending into said ignition unit, said ignition unit having a common high-frequency choke for each of said primers, each of said primers having a common ground lead, said common cable having cores which are branched off following said high-frequency choke to each of said primers, said high-frequency choke being arranged in said common ground lead of said primers.

11. The linear actuator as set forth in claim 8 wherein said ignition unit is configured as a plug connection for mounting to said cylinder.

12. The linear actuator as set forth in claim 8 wherein said ignition unit is part of a plug connection.

13. The linear actuator as set forth in claim 12 wherein said cylinder wall has through-openings for receiving said primers, said body of said gas generator being weakened at regions opposing said through-openings to facilitate breaking through said body upon ignition of one of said propellants.

14. The linear actuator as set forth in claim 1 wherein said interior of said gas generator has a working space and several coaxial ring-shaped spaces, each of said spaces opening into said working space and being filled by one of said propellants, said gas generator including a face end cover which separates each propellant from said working space in a non-activated condition and protects each propellant from being actuated by the ignition of another of said propellants.

15. A pyrotechnic linear actuator for a belt tensioner comprising:

a cylinder;

a piston disposed in said cylinder;

a multi-stage gas generator disposed in said cylinder and having several propellants for generating gas to move said piston in said cylinder, each of said propellants being separated from one another and being actuatable separately, individually, or at the same time;

a common ignition unit for actuating each of said propellants in said gas generator, said common ignition unit having a corresponding primer assigned to each of said propellants, each of said primers having a common ground lead; and a common cable extending into said ignition unit and having a common high-frequency choke for each of said primers integrated in said ignition unit, said common cable having cores which are branched off following said high-frequency choke to each of said primers, said high-frequency choke being arranged in said common ground lead of said primers.

16. The linear actuator as set forth in claim 15 further comprising at least one sensor for sensing at least one of a vehicle occupant parameter, a vehicle parameter, and a vehicular environment parameter, and an activator connected to said at least one sensor which controls activation of one or more of said propellants as a function of the sensed parameters.

17. The linear actuator as set forth in claim 16 wherein said at least one sensor senses at least one of seat occupancy, body weight of a vehicle occupant, stature of a vehicle occupant, seating position of a vehicle occupant collision intensity, vehicular indoor temperature, and outdoor temperature.

18. The linear actuator as set forth in claim 15 wherein said propellants have differing actuating capacities.

* * * * *